(12) United States Patent
Urash

(10) Patent No.: US 6,921,327 B2
(45) Date of Patent: Jul. 26, 2005

(54) EXHAUST PIPE COVER

(76) Inventor: Richard Urash, 492 Logan Store Rd., Americus, GA (US) 31719

(*) Notice: Subject to any disclaimer, the term of this patent is extended or adjusted under 35 U.S.C. 154(b) by 114 days.

(21) Appl. No.: 10/673,899

(22) Filed: Sep. 29, 2003

(65) Prior Publication Data
US 2005/0090193 A1 Apr. 28, 2005

(51) Int. Cl.[7] .............................................. F23J 13/08
(52) U.S. Cl. ........................ 454/5; 454/4; 60/324
(58) Field of Search ............................ 454/5, 2, 4, 6, 454/20; 52/198, 199; 60/324

(56) References Cited

U.S. PATENT DOCUMENTS

| | | | |
|---|---|---|---|
| 3,745,907 A * | 7/1973 | Zarfoss et al. .................. 454/4 |
| 3,788,072 A | 1/1974 | Burger | |
| 3,791,282 A | 2/1974 | McElhose et al. | |
| 3,964,376 A | 6/1976 | Janke | |
| 4,020,754 A * | 5/1977 | Dalsin et al. .................. 454/4 |
| 4,106,290 A | 8/1978 | Johnson | |
| 4,226,173 A | 10/1980 | Khosropour | |
| 4,256,257 A * | 3/1981 | Pinkerton .................. 236/1 G |
| 4,380,952 A | 4/1983 | Jones et al. | |
| 4,495,859 A | 1/1985 | Janke et al. | |
| 4,554,863 A * | 11/1985 | Dalsin .......................... 454/4 |
| 4,671,171 A | 6/1987 | Brill | |
| 4,727,796 A | 3/1988 | Derkach | |
| 4,821,629 A | 4/1989 | Davison et al. | |
| 4,909,239 A * | 3/1990 | Hoyme ................... 126/285 B |
| 5,094,050 A * | 3/1992 | Jenkins ....................... 52/218 |
| 5,848,931 A * | 12/1998 | Dortzbach .................... 454/4 |

* cited by examiner

Primary Examiner—Derek S. Boles
(74) Attorney, Agent, or Firm—Myers & Kaplan, LLC; Ashish D. Patel

(57) ABSTRACT

An exhaust pipe cover adapted to resist wind-induced uplift and entry of any accompanying and/or independent rain, snow, dirt, dust, and/or other foreign matter, into the exhaust pipe and communicating engine, wherein such a device may be retrofitted to existing vertically-disposed exhaust pipes extending from engines incorporated into machinery such as, for exemplary purposes only, tractors, trucks, irrigation motors, generators, and the like.

19 Claims, 4 Drawing Sheets

EXHAUST PIPE COVER

TECHNICAL FIELD

The present invention relates generally to exhaust pipe covers, and more specifically to an exhaust pipe cover configured and adapted to cap or overlay an exhaust pipe port, wherein ejection of exhaust through the exhaust pipe port results in the vertical elevation or displacement and full clearance of the cover from the exhaust pipe port. In view of conventional disc or plate-like exhaust pipe covers pivotally-fixed to the exhaust pipe port, the present exhaust pipe cover is particularly advantageous for its ability to resist forceful wind-induced, pivotal uplift, and thus prevents the entry of rain, snow, dirt, dust, and/or other foreign particulate or matter, into the exhaust pipe and the communicating engine.

BACKGROUND OF THE INVENTION

In general, exhaust pipes function to expel waste gases produced in the combustion chamber of an engine. Many large gasoline, diesel, and/or gasoline-oil mix engines often comprise a vertically-disposed exhaust pipe to facilitate ejection of such waste gases. Additionally, because machinery (i.e., tractors, trucks, irrigation motors, generators, or the like) incorporating such engines with vertically-disposed exhaust pipes are typically utilized in the open environment, the port of the vertical exhaust pipe is often covered via a pivotally-fixed or hinged lid, flap or other plate-like cover, so as to prevent the entry of rain, snow, dirt, dust, and/or other foreign particulate or matter, into the exhaust pipe and the communicating engine. However, such pivotally-fixed plate-like covers possess inherent disadvantages that render use of same highly inefficient, impractical and problematic.

Specifically, many pivotally-fixed plate-like covers possess a diameter greater than the diameter of the exhaust pipe port and, as such, often extend a particular distance past the peripheral edge thereof when seated flush thereagainst. Such a selected structural arrangement and dimensional difference in diameter is utilized to preclude recession or entry of the plate-like cover into the exhaust pipe port, and subsequent lodging of same therewithin. However, the portion of the plate-like cover extending past the peripheral edge of the exhaust pipe port is also subject to being "caught" by forceful gusts of wind that result in the forceful, pivotal uplift of the plate-like cover. Unfortunately, in the presence of inclement weather, such wind-induced pivotal uplift of the plate-like cover may result in the entry of rain, snow, dirt, dust, and/or other foreign matter, into the exhaust pipe and communicating engine, thereby resulting in potential damage to the internal components thereof.

Although plate-like covers having a peripheral edge flush with the peripheral edge of the exhaust pipe port are available, such structural arrangements are not immune from wind-induced pivotal uplift and accompanying entry of foreign matter into the exhaust port.

Additionally, plate-like covers having counterweights also present disadvantages. Specifically, because such assemblies provide a nearly balanced cover, light winds often possess sufficient force to lift the cap. As such, in the presence of corrosion in the pivot joint or hinges, and combined with the nearly balanced construction of such counterweighted-cover assemblies, the cover, once lifted via wind forces, will remain in an open or flipped back position, thereby permitting the introduction of rain and other foreign matter into the exhaust pipe.

However, even in the absence of forceful winds, plate-like covers in general do not completely preclude the entry or seepage of rainwater therepast and into the exhaust pipe, and therefore, inadequately shield the internal, communicating engine components from associated water damage.

Therefore, it is readily apparent that there is a need for an exhaust pipe cover adapted to resist wind-induce uplift, and entry of any accompanying rain, snow, dirt, dust, and/or other foreign matter, into the exhaust pipe and communicating engine, wherein such a device may be retrofitted to existing vertically-disposed exhaust pipes extending from engines incorporated into machinery such as, for exemplary purposes only, tractors, trucks, irrigation motors, generators, and the like. There is also a need for an exhaust pipe cover that effectively precludes the entry or seepage of any rainwater therepast and into the exhaust pipe and communicating engine components.

BRIEF SUMMARY OF THE INVENTION

Briefly described, in a preferred embodiment, the present invention overcomes the above-mentioned disadvantages and meets the recognized need for such a device by providing an exhaust pipe having an extended peripheral lip to facilitate coverage of an exhaust pipe port, wherein the cover is adapted to be vertically elevated and fully "cleared" or displaced therefrom via the ejection of exhaust through the exhaust pipe port, and wherein cessation of forceful exhaust pressures results in the return of the cover over the exhaust pipe port. The cover is preferably retained and guided during vertical displacement within a vertically disposed guide plate having a track formed therethrough. Movement of the cover within the track is facilitated via a system of bearings incorporated with the cover.

According to its major aspects and broadly stated, the present invention in its preferred form is an exhaust pipe cover having, in general, a cover, guide plate and guide track.

More specifically, the present invention is an exhaust pipe cover having a cap or cover comprising an extended peripheral lip possessing a pair of brackets or arms adjoined therewith and extending therefrom. A series of bolts with overlying bearings extend through the arms and assist in retaining the arms, and attached cover, in slidable engagement with a guide track formed through a vertically-disposed guide plate removably fastened to the port of the exhaust pipe. As such, in the presence of forceful exhaust emissions from the exhaust pipe port, the cover is forced upward and vertically guided through the track of the guide plate and, once fully cleared from the exhaust pipe port, tilts back into an upright position (i.e., into a substantially ninety-degree angle relative to the resting position of the cover and/or the cover's vertical displacement and ascent through the guide track just before tilting into an upright position). Cessation of exhaust pressures through the exhaust pipe results in downward pivotal movement of the cover and subsequent downward vertical descent of the cover into its resting position over the exhaust pipe port.

Accordingly, a feature and advantage of the present invention is its ability to resist wind-induce uplift and entry of any accompanying rain, snow, dirt, dust, and/or other foreign matter, into the exhaust pipe and communicating engine.

Another feature and advantage of the present invention is its ability to effectively preclude the entry or seepage of any rainwater therepast and into the exhaust pipe and communicating engine components.

Still another feature and advantage of the present invention is its ability to provide an extended peripheral lip to facilitate coverage of an exhaust pipe port.

Yet another feature and advantage of the present invention is its ability to provide a guide track system to permit vertical displacement and full clearance of a cover from an exhaust pipe port.

Yet still another feature and advantage of the present invention is its incorporation of a bearing system to permit slidable engagement and vertical displacement of a cover within a vertically-disposed guide track.

A further feature and advantage of the present invention is its ability to shield the interior of an exhaust pipe and communicating engine components from entry of harmful foreign matter.

Still a further feature and advantage of the present invention is its ability to be retrofitted to existing vertically-disposed exhaust pipes extending from engines incorporated into machinery such as, for exemplary purposes only, tractors, trucks, irrigation motors, generators, and the like.

These and other features and advantages of the present invention will become more apparent to one skilled in the art from the following description and claims when read in light of the accompanying drawings.

BRIEF DESCRIPTION OF THE DRAWINGS

The present invention will be better understood by reading the Detailed Description of the Preferred and Alternate Embodiments with reference to the accompanying drawing figures, in which like reference numerals denote similar structure and refer to like elements throughout, and in which.

DETAILED DESCRIPTION OF THE PREFERRED AND ALTERNATIVE EMBODIMENTS

In describing the preferred and alternate embodiments of the present invention, as illustrated in FIGS. 1–4B, specific terminology is employed for the sake of clarity. The invention, however, is not intended to be limited to the specific terminology so selected, and it is to be understood that each specific element includes all technical equivalents that operate in a similar manner to accomplish similar functions.

Figure 1:
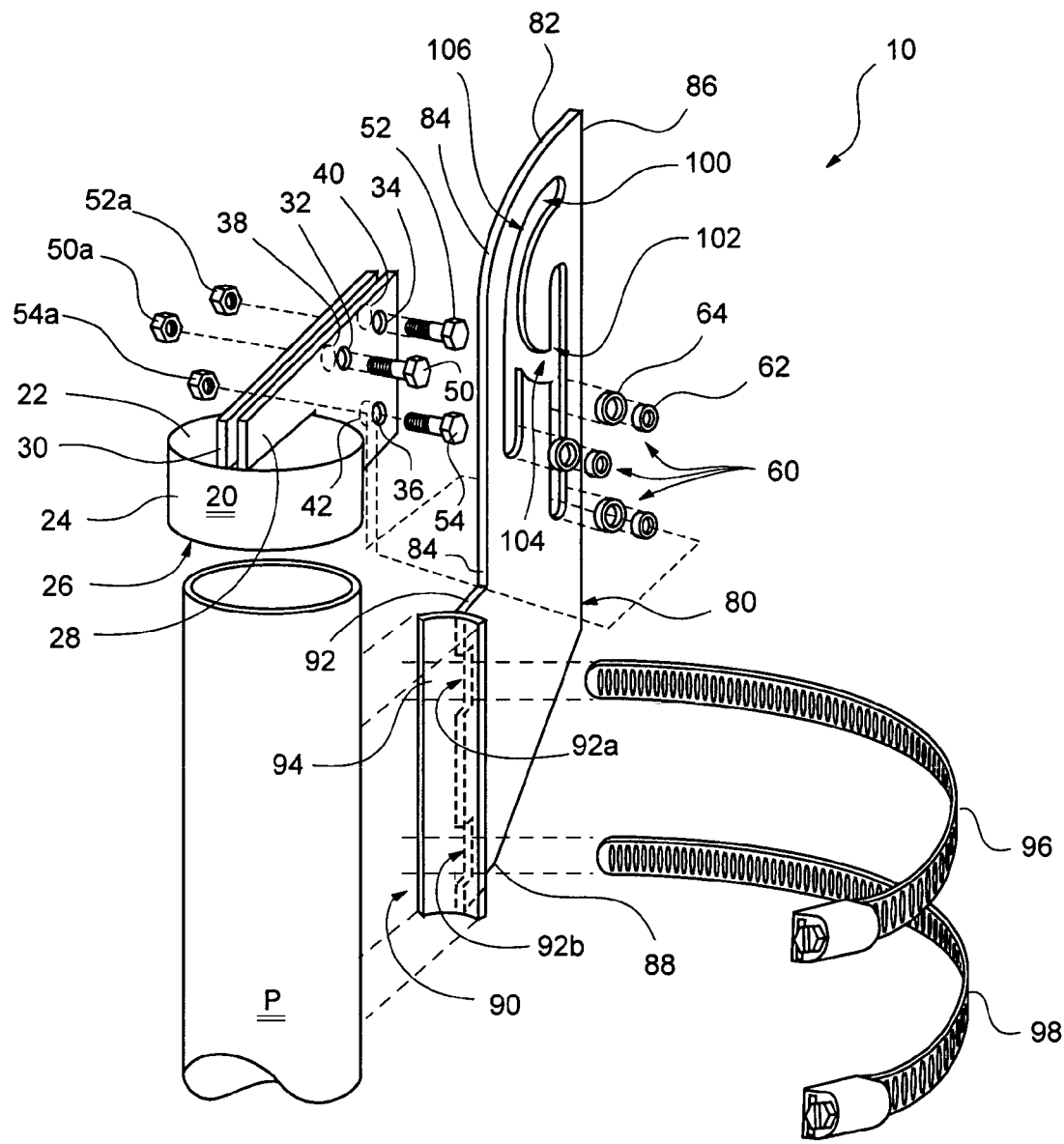
FIG. 1 is an exploded view of an exhaust pipe cover according to a preferred embodiment of the present invention.
Figure 2:
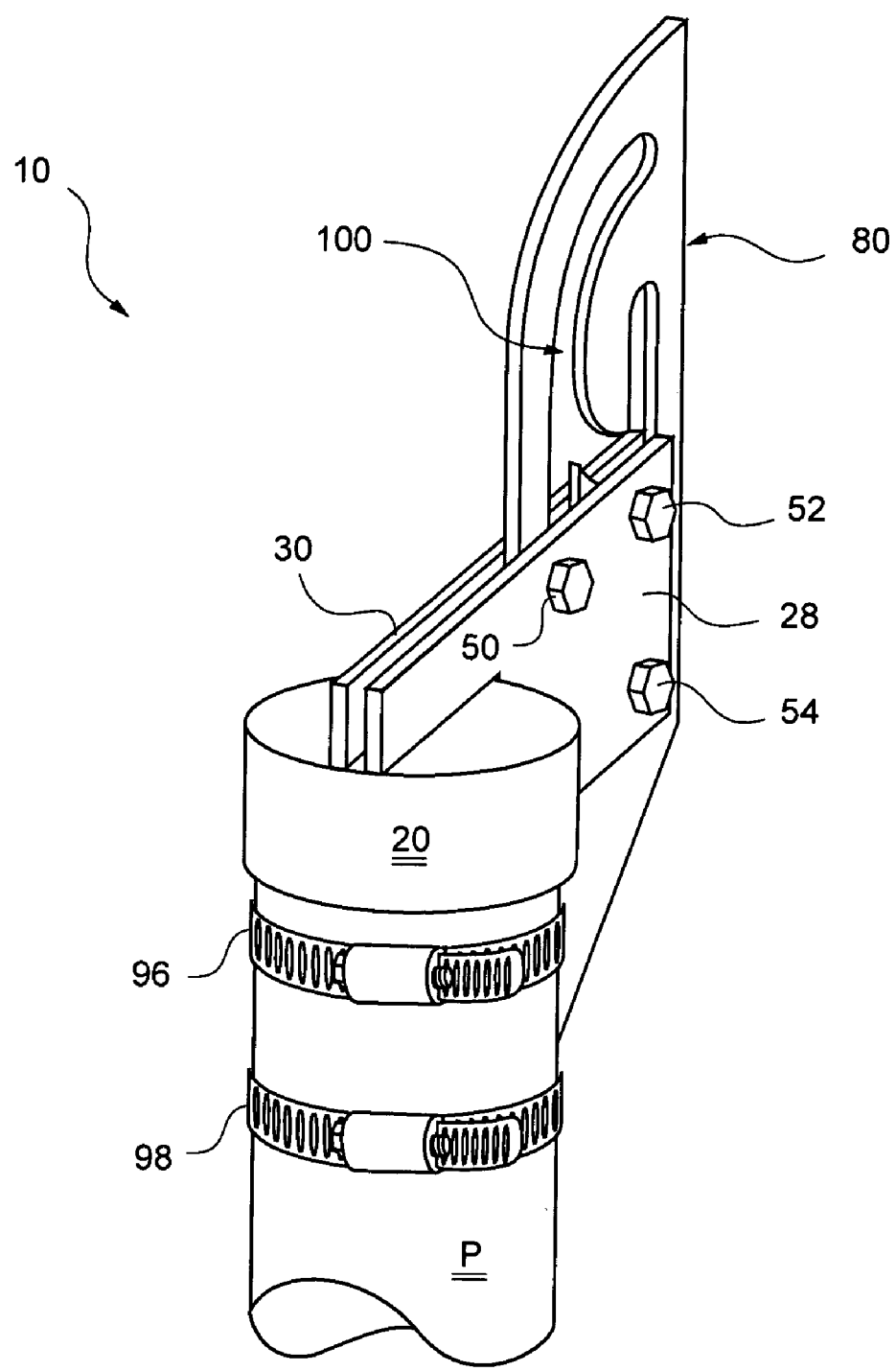
FIG. 2 is a perspective view of an exhaust pipe cover according to a preferred embodiment of the present invention, showing the cover in a resting position.
Figures 3A, 3B:
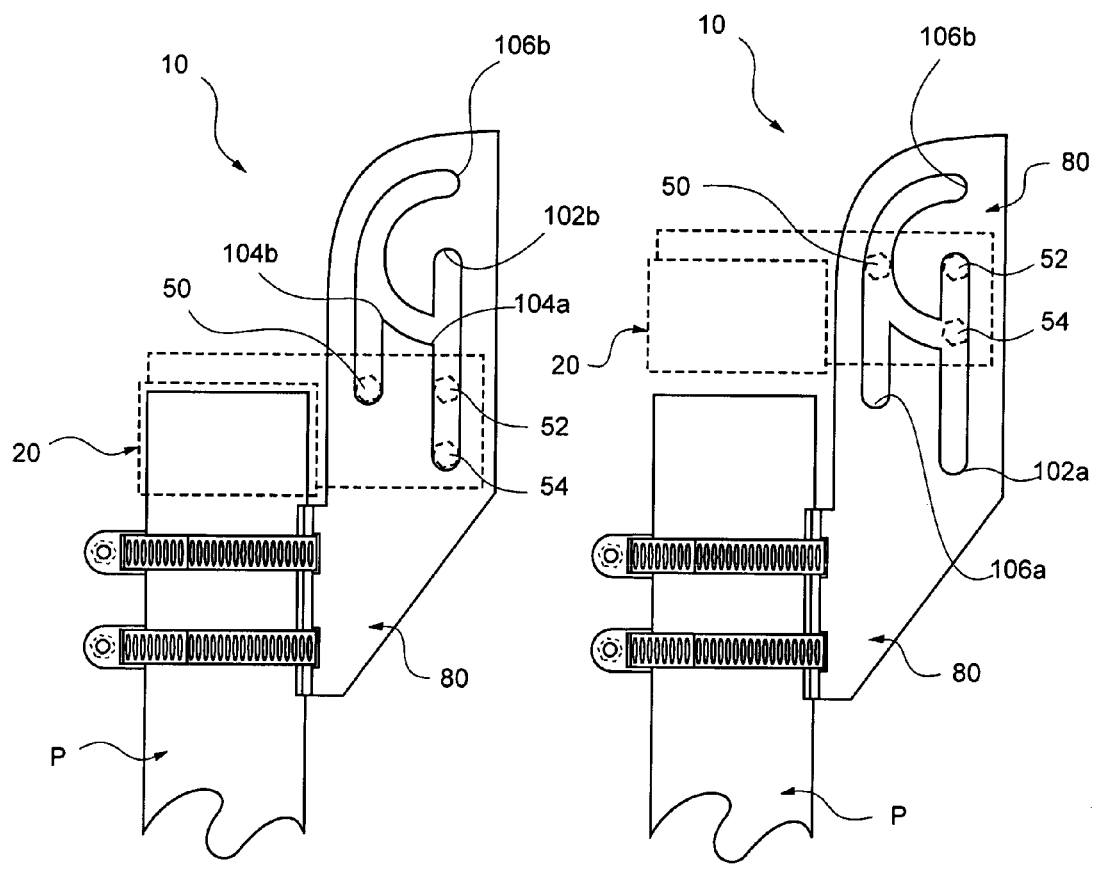
FIG. 3A is a side view of an exhaust pipe cover according to a preferred embodiment of the present invention, showing the cover in a resting position.
FIG. 3B is a side view of an exhaust pipe cover according to a preferred embodiment of the present invention, showing the cover vertically displaced and moving through an ascending position.
Figures 4A, 4B:
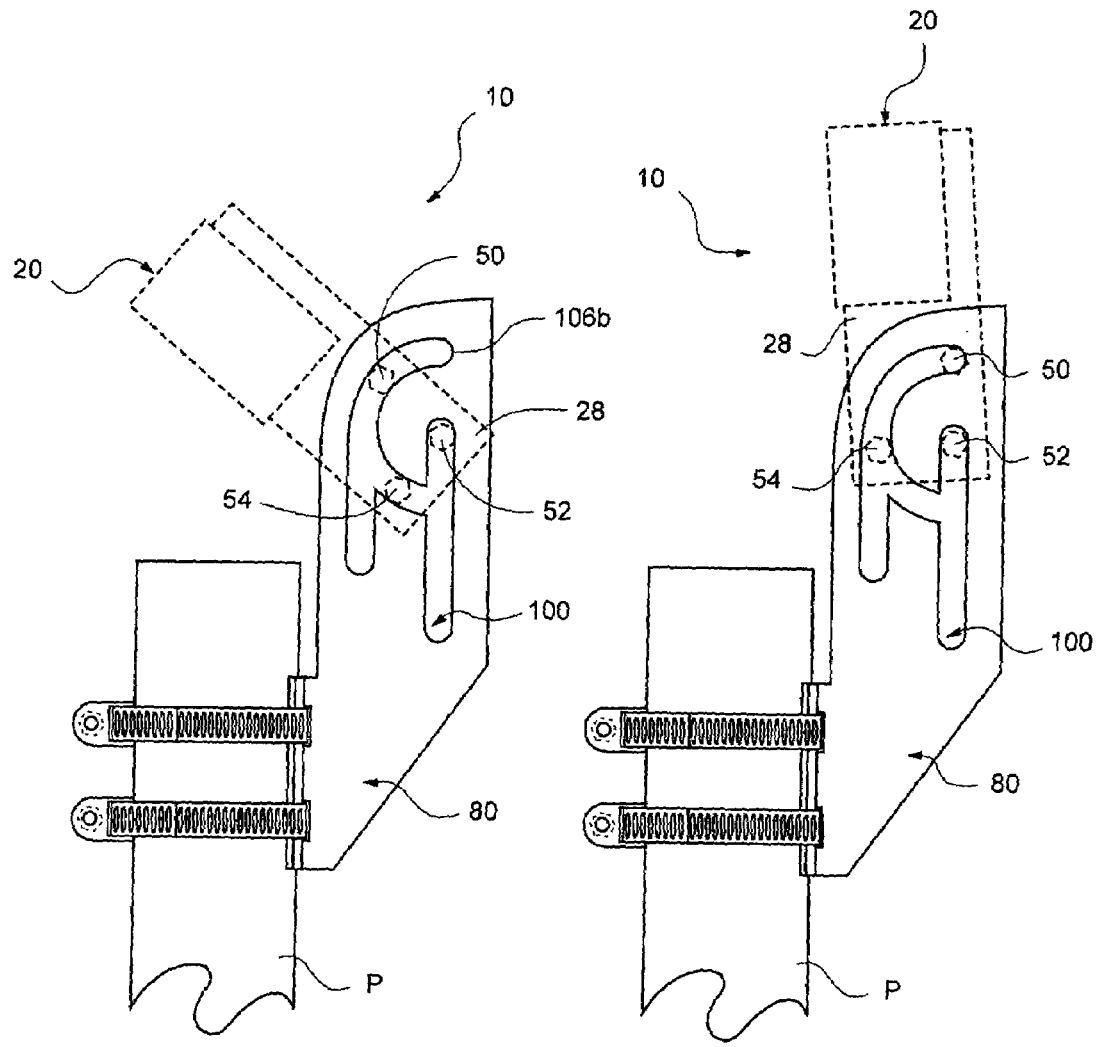
FIG. 4A is a side view of an exhaust pipe cover according to a preferred embodiment of the present invention, showing the cover moving through an ascending position toward a fully displaced and upright position; and, FIG. 4B is a side view of an exhaust pipe cover according to a preferred embodiment of the present invention, showing the cover in a fully displaced and upright position.

Referring now to FIG. 1, the present invention in a preferred embodiment is an exhaust pipe cover 10 comprising cover portion 20, guide plate 80 and guide track 100, wherein guide track 100 is preferably formed through guide plate 80, as more fully described below. Preferably, cover portion 20 and guide plate 80 are manufactured from a suitable metal, such as, for exemplary purposes only, aluminized steel, stainless steel, zinc plated heavy-gauge steel, galvanized steel, and/or any other material (metallic or non-metallic) capable of withstanding extreme temperatures, corrosion, rust, and the like.

Cover portion 20 is preferably substantially cylindrical-shaped, comprising upper member 22 and peripheral wall 24 extending downwardly therefrom. Upper member 22 and peripheral wall 24 preferably define recess 26, wherein recess 26 preferably comprises a sufficient diameter dimensioned to receive a conventional exhaust pipe port therein, and thus facilitate engagement of cover portion 20 thereover. It should be recognized that cover portion 20, and exhaust pipe cover 10 in general, could be manufactured and/or modified to facilitate application of same to any size or diameter exhaust pipe port, without departing from the appreciative scope of the present invention, as such modifications are in full contemplation of the inventor in describing the present invention herein.

Preferably affixed to, and extending from, peripheral wall 24 of cover portion 20 are brackets 28 and 30. Brackets 28 and 30 are preferably disposed approximately parallel to one another, and are positioned a sufficient distance apart to facilitate receipt of vertical guide plate 80 therein for slidable engagement therewith, as more fully described below. Preferably formed through bracket 28 are aligned upper throughholes 32 and 34, and lower throughhole 36, preferably disposed below and aligned with upper throughhole 34. Similarly, preferably formed through bracket 30 are aligned upper throughholes 38 and 40, and lower throughhole 42, preferably disposed below and aligned with upper throughhole 42. Throughholes 32, 34 and 36 of bracket 28 are preferably aligned with throughholes 38, 40 and 42, respectively, of bracket 30 to facilitate receipt therethrough of respective bolts 50, 52 and 54, for purposes more fully described below.

Preferably, guide plate 80 comprises upper arcuate edge 82, opposing edges 84 and 86, and bottom edge 88. Extending from edge 84, and disposed proximate to bottom edge 88, is approximately Y-shaped bracket 90, preferably comprising plate-like first portion 92 and arcuate second portion 94 disposed substantially perpendicular thereto. Bracket 92 preferably functions to provide guide plate 80 with lateral support against conventional exhaust pipe port P, wherein arcuate second portion 94 of bracket 90 preferably possesses a sufficient arc to facilitate substantially flush seating of same against the exterior of generally cylindrical-shaped exhaust pipe port P. It should be recognized that the general arc of arcuate second portion 94 could be manufactured and/or modified to facilitate substantially flush seating of arcuate second portion 94 to any size or diameter of cylindrical-shaped exhaust pipe port P, without departing from the appreciative scope of the present invention, as such modifications are in full contemplation of the inventor in describing the present invention herein. It is further contemplated that second portion 94 could be substantially flat or plate-like to facilitate substantially flush seating of same against a substantially flat-surface section of a selected exhaust pipe port. It is contemplated in yet another alternate embodiment that second portion 94 could be substantially cylindrical or tubular-shaped and suitably dimensioned to facilitate a frictional or interference-fit over exhaust pipe port P.

Preferably formed at the interface of first portion 92 and arcuate second portion 94 of bracket 90 are apertures or slots 92*a* and 92*b*. Slots 92*a* and 92*b* are preferably dimensioned to receive hose gear or worm gear clamps 96 and 98 therethrough for securing guide plate 80 to exhaust pipe port P in a substantially upward or vertical configuration, as more fully described below. Although clamps 96 and 98 are preferably utilized to secure guide plate 80 to exhaust pipe port P, it is contemplated in alternate embodiment that other suitable fastening mechanisms could be utilized, such as, for exemplary purposes only, ties, clasps, rivets, bolts, screws, spot welding, integral formation, or the like.

Preferably formed through guide plate 80 is guide track 100, wherein guide track 100 preferably assists in maintaining cover portion 20 in slidable engagement with guide plate 80, and thus functions to guide cover portion 20 through a specific vertical displacement during emission, and subsequent cessation, of waste gases through exhaust pipe port P. Specifically, guide track 100 preferably comprises first linear track 102 formed proximal edge 86 of guide plate 80, second arcuate track 106 formed proximal edge 84 and upper arcuate edge 82, and connecting track 104 extending between and in communication with first linear track 102 and second arcuate track 106. The dimensions, configuration, and strategically-selected relative positions of tracks 102, 104 and 106 within guide plate 80 will become more apparent to one skilled within the art in view of the following description detailing the interaction of cover portion 20, brackets 28 and 30, and bolts 50, 52 and 54 with guide track 100.

More specifically, upon fully engaging guide plate 80 within brackets 28 and 30 of cover portion 20, respective throughholes 34, 36, 40 and 42 preferably align within first linear track 102, and respective throughholes 32 and 38 preferably align within second arcuate track 106. Thereafter, a two-piece bearing assembly 60 is preferably concentrically positioned between each throughhole 32, 34 and 36 of bracket 28 and respectively aligned throughholes 38, 40 and 42 of bracket 30. Bearing assemblies 100 are preferably retained between brackets 28 and 30 via insertion of bolts 50, 52 and 54 through throughholes 32, 34 and 36, respectively, through respective bearing assemblies 60, and through respectively aligned throughholes 38, 40 and 42, wherein bolts 50, 52 and 54 are subsequently secured therewithin via nuts 50*a*, 52*a* and 54*b*, respectively. In such a configuration, retaining brackets 28 and 30, and attached cover portion 20, are maintained in slidable engagement with guide track 100, as more fully described below.

Preferably, each bearing assembly 60 is structurally and functionally equivalent, comprising inner bearing portion 62 and outer bearing portion 64 seated thereover. Inner bearing portion 62 is preferably slightly longer than outer bearing portion 64, so as to permit inner bearing portion to be securely retained or clamped between brackets 28 and 30 via a selected bolt 50, 52 and 54, as more fully described below. Outer bearing portion 64 is preferably dimensioned to be seated over inner bearing portion 62 and rotate freely thereover, wherein suitable lubricants may be utilized therebetween to facilitate rotational interaction of same and reduce surface friction therebetween. Preferably, outer bearing portion 64 of each bearing assembly 60 comprises a circumference sufficient to permit slidable interaction of outer bearing portion 64 within tracks 102, 104 and 106 of guide track 100, wherein suitable lubricants may be utilized therebetween to facilitate rotational interaction of same and reduce surface friction therebetween. Although a two-piece bearing system 60 is preferred, it should be recognized that any suitable bearing system could be utilized to facilitate slidable interaction of cover portion 20 with guide track 100, such as, for exemplary purposes only, single-pieced bearings, needle bearings, ball bearings, sleeve bearings, sintered metal bearings, simple clearance and lubrication arrangements, or the like. It is further contemplated that the external surface of each outer bearing portion 64 could possess a groove, channel, or could comprises a concave bearing, to facilitate slidable interlocking with the edges of each track 102, 104 and 106.

As best illustrated in FIGS. 2–4B, to secure guide plate 80 to exhaust pipe port P in a substantially upward or vertical configuration, clamps 96 and 98 are preferably passed through respective slots 92*a* and 92*b* of first portion 92, and appropriately fastened around exhaust pipe port P. Preferably, guide plate 80 is appropriately positioned and fastened around exhaust pipe port P so that cover portion 20 is fully seated over and rests on exhaust pipe port P. In such a "resting" configuration, bolt 54 and corresponding bearing assembly 60 preferably rest in lower terminal region 102*a* of first linear track 102, wherein bolt 50 and corresponding bearing assembly 60 preferably rest in lower terminal region 106*a* of second arcuate track 106.

As such, and with specific reference to FIGS. 3A–4B, in the presence of forceful exhaust emissions from exhaust pipe port P, cover portion 20 is forced upward and vertically guided through guide track 100. Specifically, bolts 50, 52 and 54 and corresponding bearing assemblies 60 preferably assist in slidably guiding cover portion 20 though guide track 100 in the presence of forceful exhaust emissions. Contact of bolt 52 and corresponding bearing assembly 60 with upper terminal end 102*b* of first linear track 102 interrupts vertical displacement of cover portion 20, and results in bolt 54 and corresponding bearing assembly 60 aligning with and slidably passing through first end 104*a* of connecting track 104; thereby, permitting upward pivotal movement of cover portion 20. Contemporaneous with the slidable passage of bolt 54 through connecting track 104, bolt 50 and corresponding bearing assembly 60 slidably move upward and through second arcuate track 106. As bolt 54 passes through second end 104*b* of connecting track 104 and into second arcuate track 106, bolt 50 proceeds through the arcuate path of second arcuate track 106, wherein contact of bolt 50 with upper terminal region 106*b* of second arcuate track 106 forces cover portion 20 into a substantially upright position (i.e., into an approximately ninety-degree angle relative to the resting position of cover portion 20 and/or cover portion's 20 vertical displacement and ascent through guide track 100 just before tilting into an upright position). Cessation of exhaust pressures through exhaust pipe port P results in downward pivotal movement of cover portion 20 and subsequent downward vertical descent of cover portion 20 into its resting position over exhaust pipe port P. Although cover portion 20 is brought into a substantially upright position, it should be recognized that cover portion 20 could be brought into any pivotal angle, or, alternately, permitted to only move in vertical displacement and not in a pivotal or tilting movement.

It should further be recognized that guide track 100 of exhaust pipe cover 10 could be selectively modified to reflect other designs, arrangements and/or configurations to facilitate or manipulate vertical and/or pivotal movement of cover portion 20 slidably engaged therewith. It is contemplated that such modifications could be implemented when it is desirous to equip unconventional exhaust pipes with the present invention.

It is contemplated in another alternate embodiment that recess 26 of cover portion 20 could incorporate any suitable seal to facilitate air-tight and/or water-tight engagement with exhaust pipe port P, wherein such seals may include, without limitation, heat-resistant rubber seals, elastomeric seals, fiber seals, asbestos seals, ribbed seals, or the like. Such seals could be suitably placed in recess 26 and selectively fastened or secured therein via suitable heat-resistant adhesives, epoxies or resins, and/or via riveting, other suitable mechanical fasteners, integral formation, or the like. Such seals could also be placed on the peripheral edge of exhaust pipe port P.

It is still further contemplated that guide plate 80 could comprise a ring-like flange portion formed thereon, and extending therefrom, for surroundingly engaging exhaust pipe port P in the lateral plane relative to the centerline of exhaust pipe port P. The flange portion could comprise a seal affixed thereon and therearound to permit cover portion 20 to rest thereagainst, and accordingly seal-off exhaust pipe port P. Such seals may include, without limitation, heat-resistant rubber seals, elastomeric seals, fiber seals, asbestos seals, ribbed seals, or the like.

Having thus described exemplary embodiments of the present invention, it should be noted by those skilled in the art that the within disclosures are exemplary only, and that various other alternatives, adaptations, and modifications may be made within the scope of the present invention. Accordingly, the present invention is not limited to the specific embodiments illustrated herein, but is limited only by the following claims.

What is claimed is:

1. An exhaust pipe cover assembly, comprising:
   a guide track wherein said guide track comprises a first linear track and further comprising a second arcuate track.

2. The exhaust pipe cover assembly of claim 1, wherein said guide track further comprises a connecting track extending between and in communication with said first linear track and said second arcuate track.

3. The exhaust pipe cover assembly of claim 2, wherein said guide track further comprises a cover portion slidably engaged therewith, said cover portion dimensioned to be seated over an exhaust pipe port.

4. The exhaust pipe cover assembly of claim 3, wherein said cover portion is slidably engaged with said guide track via a bearing.

5. The exhaust pipe cover assembly of claim 4, wherein said cover portion comprises an elongated or extended peripheral wall to facilitate full coverage over the exhaust pipe port.

6. The exhaust pipe cover assembly of claim 5, wherein forceful exhaust emissions through the exhaust pipe port results in vertical displacement of said cover portion, and clearance of said cover portion from the exhaust pipe port.

7. The exhaust pipe cover assembly of claim 6, wherein vertical displacement of said cover portion is followed by pivotal tilting of said cover portion.

8. The exhaust pipe cover assembly of claim 7, wherein pivotal tilting of said cover portion is followed by said cover portion proceeding into an approximately upright position defined as approximately ninety degrees from resting state of said cover portion over the exhaust pipe port.

9. An exhaust pipe cover assembly, comprising:
   a guide plate comprising a guide track formed therethrough, said guide plate comprising means for removably securing said exhaust pipe cover assembly to an exhaust pipe port, wherein said guide track comprises a first linear track and further comprising a second arcuate track.

10. The exhaust pipe cover assembly of claim 9, wherein said guide track further comprises a connecting track extending between and in communication with said first linear track and said second arcuate track.

11. The exhaust pipe cover assembly of claim 10, wherein said guide track further comprises a cover portion slidably engaged therewith, said cover portion dimensioned to be seated over the exhaust pipe port.

12. The exhaust pipe cover assembly of claim 11, wherein said cover portion is slidably engaged with said guide track via a bearing.

13. The exhaust pipe cover assembly of claim 12, wherein said cover portion comprises an elongated or extended peripheral wall to facilitate full coverage over the exhaust pipe port.

14. The exhaust pipe cover assembly of claim 13, wherein forceful exhaust emissions through the exhaust pipe port results in vertical displacement of said cover portion, and clearance of said cover portion from the exhaust pipe port.

15. The exhaust pipe cover assembly of claim 14, wherein vertical displacement of said cover portion is followed by pivotal tilting of said cover portion.

16. The exhaust pipe cover assembly of claim 15, wherein pivotal tilting of said cover portion is followed by said cover portion proceeding into an approximately upright position defined as approximately ninety degrees from resting state of said cover portion over the exhaust pipe port.

17. The exhaust pipe cover assembly of claim 9, wherein said removable securing means is an aperture formed through said guide plate, said aperture adapted to receive a clamp for removably securing said exhaust pipe cover assembly to the exhaust pipe port.

18. A method of shielding an exhaust pipe port from entry of foreign matter therein, said method comprising the steps of:
   a. obtaining an exhaust pipe cover assembly, comprising:
      a guide track; and,
      a cover portion slidably engaged with said guide track; and
   b. permitting said cover portion to rest over the exhaust pipe port; and,
   c. permitting said cover portion to slidably interact with said guide track and be vertically displaced upon the forceful emission of exhaust through the exhaust pipe port, further comprising the step of permitting said cover portion to pivotally tilt after being vertically displaced.

19. The method of claim 18, further comprising the step of permitting said cover portion to proceed into an approximately upright position after being pivotally tilted, said upright position defined as approximately ninety degrees from resting state of said cover portion over the exhaust pipe port.

* * * * *